US006770232B2

(12) United States Patent
Prodi

(10) Patent No.: US 6,770,232 B2
(45) Date of Patent: Aug. 3, 2004

(54) METHOD FOR LOADING THE MOULD CAVITY WITH POWDER OR GRANULAR MATERIAL IN CERAMIC TILE MANUFACTURE

(75) Inventor: Giorgio Prodi, Sassuolo (IT)

(73) Assignee: L.B. - Officine Meccaniche - S.p.A., Fiorano Modenese (IT)

( * ) Notice: Subject to any disclaimer, the term of this patent is extended or adjusted under 35 U.S.C. 154(b) by 349 days.

(21) Appl. No.: 09/911,411

(22) Filed: Jul. 25, 2001

(65) Prior Publication Data

US 2002/0011680 A1 Jan. 31, 2002

(30) Foreign Application Priority Data

Jul. 31, 2000 (IT) ..................................... RE2000A0077

(51) Int. Cl.[7] ............................. B28B 1/00; B28B 3/00; B29C 31/00

(52) U.S. Cl. ....................... 264/113; 264/121; 264/122; 264/123

(58) Field of Search ................................. 264/109–128

(56) References Cited

FOREIGN PATENT DOCUMENTS

DE 372241 6/1921

OTHER PUBLICATIONS

Patent Abstracts of Japan, Publication No. 10291211, Publication Date Nov. 4, 1998.

Patents Abstracts of Japan, Publication No. 11267891, Publication Date, Oct. 5, 1999.

*Primary Examiner*—Stephen J. Lechert, Jr.
(74) *Attorney, Agent, or Firm*—Browdy and Neimark

(57) ABSTRACT

In addition to a loading apparatus (10) for loading material through the upper mouth of the mold cavity (6), the unit comprises a blower device (30) for blowing air, means for moving said device while held a short distance from the upper surface of the material (B') loaded into the mold cavity, such as to lift in a gauged manner a thin layer of material from the top thereof, and means (51, 55) for collecting the material lifted by the blower device (30), in order to remove it from the mold cavity. In particular, the blower device (30) comprises a relatively narrow, long blowing port (31) arranged to emit an air jet in the form of a thin sheet extending in a horizontal direction, and means (33, 34) for feeding compressed air to said blowing port (31), which is moved while maintained a short distance from the upper surface of the material (B') loaded into the mold cavity (6) in order to lift a thin gauged layer of material.

2 Claims, 5 Drawing Sheets

METHOD FOR LOADING THE MOULD CAVITY WITH POWDER OR GRANULAR MATERIAL IN CERAMIC TILE MANUFACTURE

TECHNICAL FIELD

This invention relates to the loading of the mould forming cavity with powder or granular material, in ceramic tile manufacture.

The mould cavity is loaded with powder or granular material by a loading apparatus which releases the material into the cavity through its upper mouth.

BACKGROUND ART

Usually the loading apparatus comprises a loading carriage of horizontal flat form, having for each mould cavity a lowerly and upperly open loading compartment and provided with a suitable grid; each compartment corresponds to a mould cavity and has plan dimensions substantially equal to those of the cavity. The carriage is moved forwards and rearwards while slidingly resting on a flat continuous surface positioned as a continuation of the upper surface of the die plate containing the cavity to be filled.

The carriage is moved synchronously with the press operations, between a retracted position in which the loading compartment receives the loading material and an advanced position in which the compartment lies above the mould cavity so that the material falls into the cavity by gravity.

If several layers of different materials are to be arranged in the mould cavity, further means are also provided, for example several loading compartments for the same mould cavity, one for each material; or one or more hoppers are used, transported by the same carriage, each of which releases material through its lower mouth into the mould cavity.

In all cases, the material is deposited into the mould cavity while the means (compartments with grids and/or hoppers) from which the material falls move horizontally above the cavity. In addition, the lower edge of said means is necessarily maintained close to the plane of the upper mouth of the mould cavity and is moved flush with the upper mouth of the mould cavity, so that the upper surface of the material which falls into the cavity is flat or flush with the upper mouth of the cavity. The horizontal movement of said lower edges plus the action of an actual scraping means, with which the carriage is provided, produces a scraping action involving a small thickness of the upper surface layer of the material deposited into the mould cavity, but displacing the powders in a disordered manner, with the result that the original plan distribution of its particles, produced by the vertical descent of the material into the mould cavity, is completely changed.

If the loaded material is perfectly uniform in terms of its colour and particle size, this scraping action has no practical effect on the appearance of the material upper surface.

If however the material is not uniform, as in the case of bulk-coloured multi-colour tiles, which are composed of materials which differ in terms of colour and/or particle size and are present either as separate or partly mixed masses, the horizontal movement of the carriage produces in practice, on the upper surface of the material loaded into the cavity, an arrangement in which the powders form striations in the scraping direction, or a sort of patina covering the underlying powder distribution, with a resultant appearance much different from that which was required for the tile.

To overcome said drawback, the tile, after pressing, has to be subjected (sometimes before firing, but more generally after firing) to a smoothing action by which a thin surface layer is removed by abrasion, of such a thickness as to remove said effects produced by the scraping of the material loaded into the mould cavity and to expose the underlying original distribution of the material particles.

This smoothing action involves considerable cost, in terms of equipment, additional operations and longer production time.

Moreover, tiles cannot be produced in which the upper surface, obtained by pressing, has an uneven or embossed or relief-patterned appearance, because said smoothing action would damage such effects, and leave the tile upper surface flat.

DISCLOSURE OF THE INVENTION

An object of this invention is to provide a loading unit and relative method able to overcome said drawbacks, and in particular able to remove the described effects produced by said scraping action during the loading of the material into the mould cavity, without it being necessary to operate on the pressed or fired tile.

A further object of the invention is to enable a bulk-coloured multi-colour tile to be formed having exposed surfaces which are not flat.

A further object of the invention is to enable an extremely thin layer (or layers) of material to be loaded onto a base layer.

These and further objects are attained by the invention as characterised in the claims.

BRIEF DESCRIPTION OF THE DRAWINGS

The invention is described in detail hereinafter with the aid of the accompanying figures, which illustrate a non-exclusive embodiment thereof by way of non-limiting example.

FIG. 1 schematically shows the lower part of a traditional mould positioned on the bed of a press of any known type; said lower part comprises a die plate 4 and a lower punch 5, which together delimit the mould cavity 6. The upper part of the mould is however not shown. The cavity 6 can have any shape; several cavities can also be provided in the same mould so that several tiles can be formed simultaneously (multiple mould).

Each cavity 6 possesses an upper mouth lying in a substantially horizontal plane, and is filled with powder or granular material by a loading apparatus 10, arranged to load material into the cavity 6 through said upper mouth.

Figure 1:
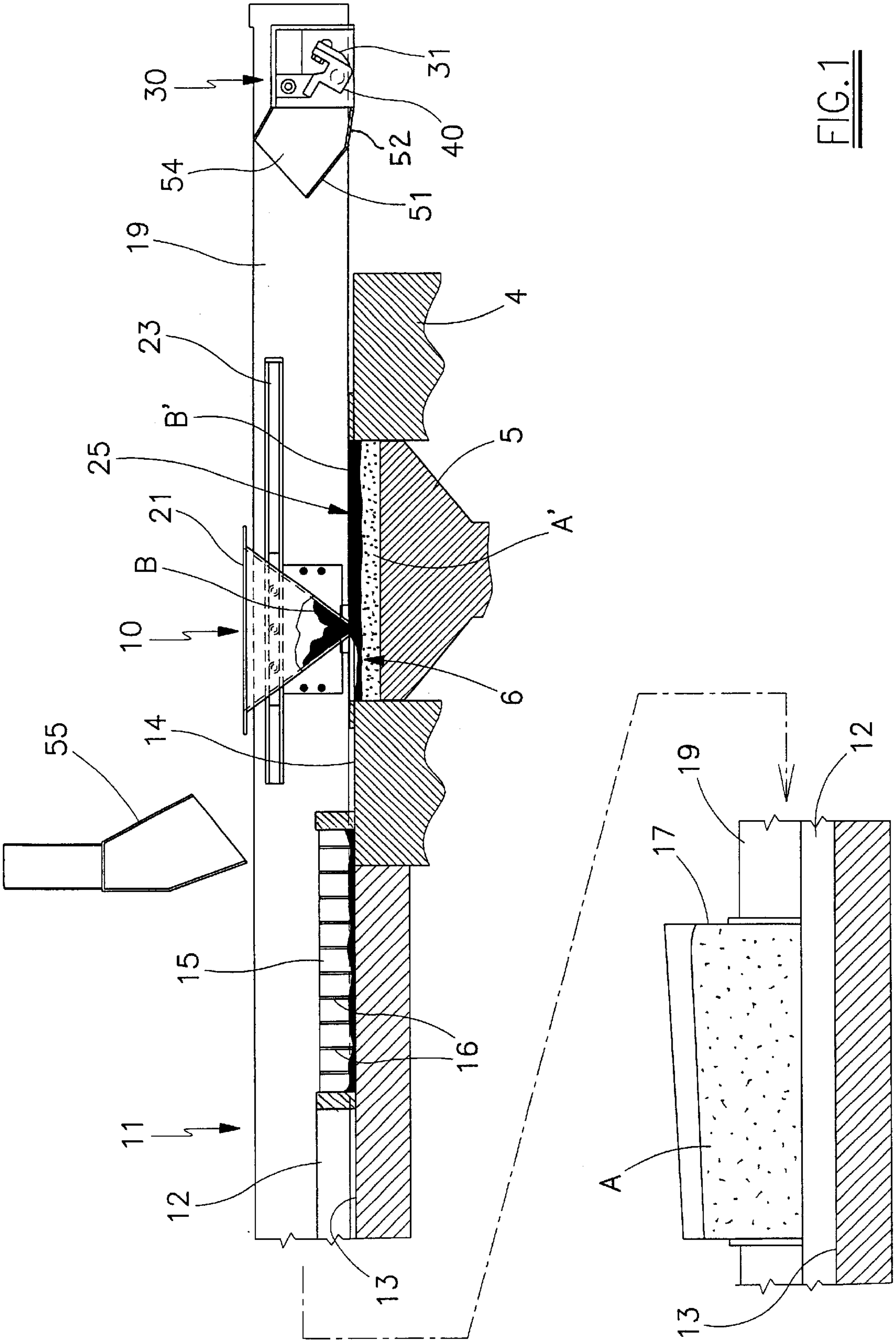
FIG. 1 is a cross-section in a vertical plane through the entire unit, during the loading of the mould cavity by the loading apparatus.
Figure 2A:
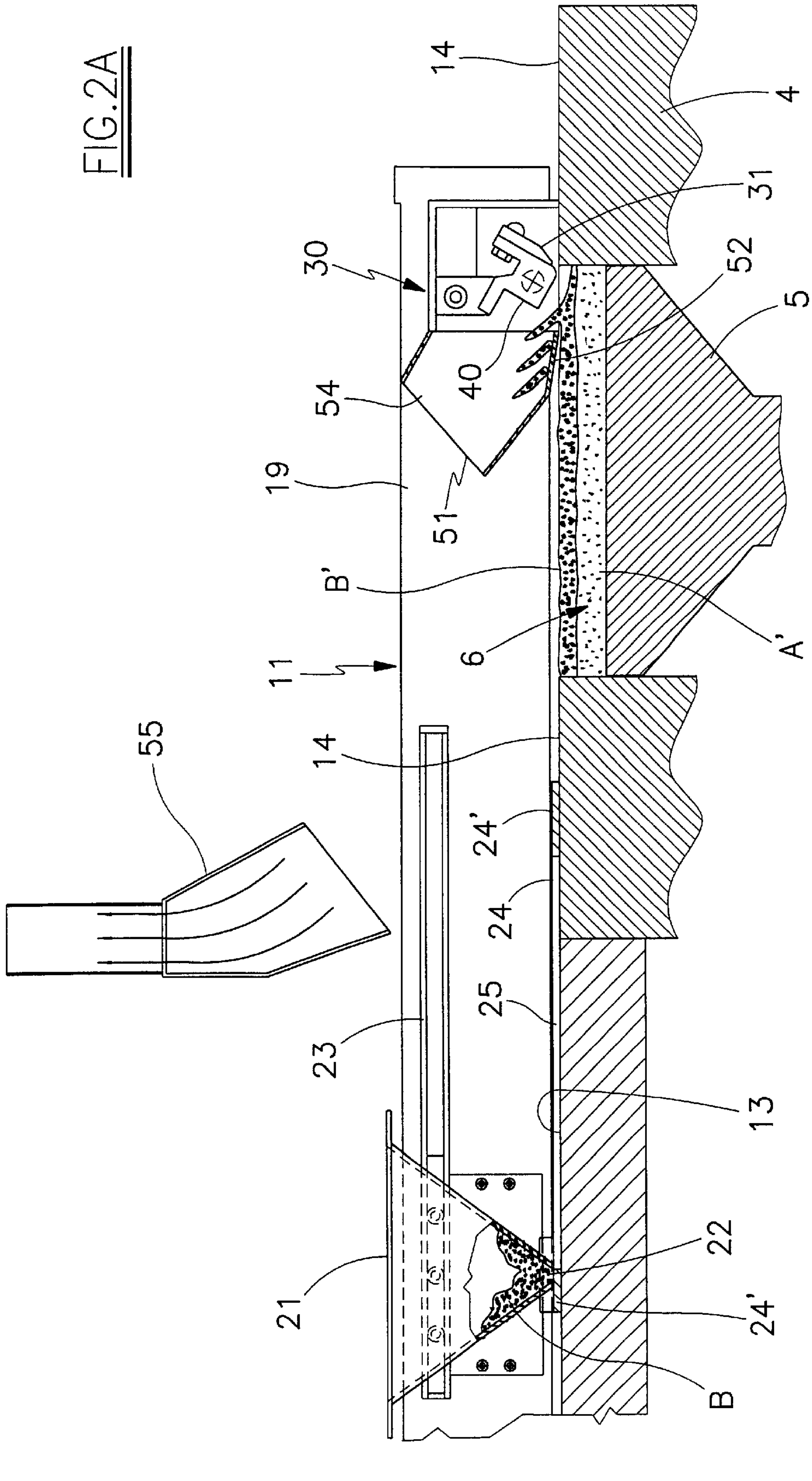
FIG. 2A is an enlarged detail of FIG. 1 in the initial position for removing a thin layer of material from the mould cavity.
Figure 2B:
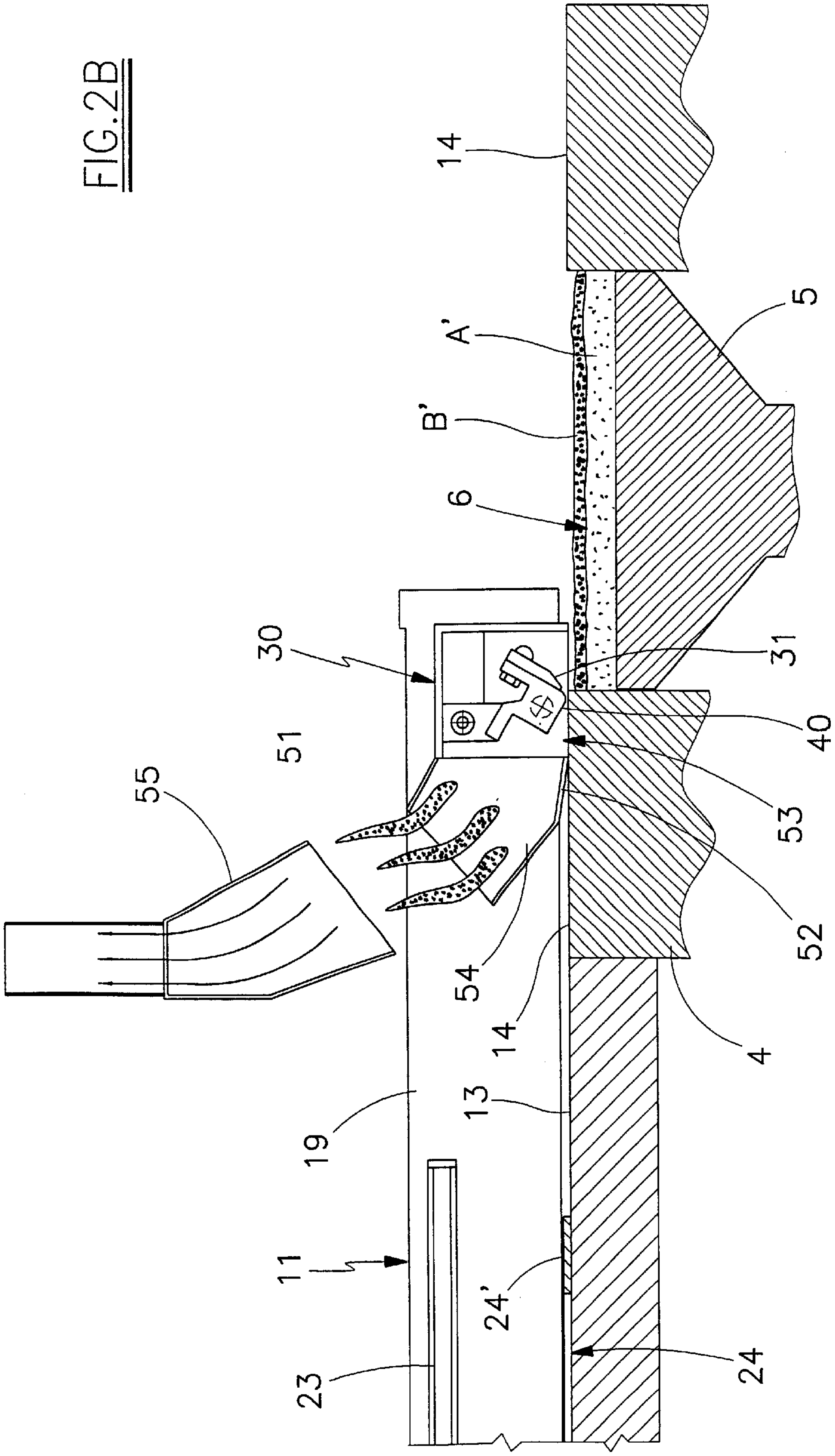
FIG. 2B is the same detail as FIG. 2, in the final position assumed by the carriage during the removal of a thin layer of material from the mould cavity.

FIG. 1 shows, by way of example, a possible embodiment of the loading apparatus 10, of known type. The invention can also be applied to loading apparatus different from that shown.

The illustrated apparatus 10 is of the type driven with reciprocating movement parallel to said upper mouth, and carries means for releasing the material though said upper mouth of the cavity in combination with its own reciprocating movement.

In detail, it comprises a loading carriage 11 having a body 12 in the form of a flat slab which slides while adhering to a horizontal slide surface 13 and to the upper surface 14 of the die plate 4; both the surfaces 13 and 14 are coplanar with the upper mouth of the cavity 6.

An upperly and lowerly loading compartment 15 of plan dimensions substantially equal to those of the mould cavity 6 is inserted into the body 12 for each cavity 6. Preferably, the compartment 15 contains a grid 16 favouring uniform distribution of the loaded material within the cavity 6.

If the mould is of multiple type, the number of loading compartments 15 provided is equal to the number of cavities 6 and have the same plan arrangement as the cavities 6.

The carriage 11 is connected to the fixed support structure of the apparatus in such as manner as to be able to slide only in a horizontal longitudinal direction.

Using known means, for example a crank mechanism operated by a motor, the carriage 11 is moved forwards and rearwards in said longitudinal direction between a retracted position and an advanced position, synchronously with the press operations.

When in its retracted position, the loading compartment 15 lies below a major hopper 17 for feeding a first loaded material A and is filled with this material. While the carriage 11 lies in its retracted position and while moving frontwards and rearwards, the open lower end of the compartment 15 is closed by the surfaces 13 and 14. When the compartment 15 lies in its advanced position above the cavity 6, the lower punch 5 is lowered to create the space for receiving the material A, which falls into it from the compartment 15.

In the embodiment shown in the figures, the carriage 11 carries to the front of the compartment 15 a minor hopper 21 arranged to contain a second material B having different characteristics (in terms of colour/type/particle size) than the first material A. The hopper 21 is of limited height in order to be able to pass into the space below the die plate 4, below the upper punch when this is in its raised position, and has a narrow long lower mouth 22 extending longitudinally in a horizontal transverse direction along the entire transverse dimension of the cavity 6.

The hopper 21 is supported by guides 23 fixed to the side walls 19 of the carriage 11, in a manner able to slide forwards and rearwards in a longitudinal direction (by usual means, not shown) so that its mouth 22 covers the entire longitudinal dimension of the cavity 6. Normally, the hopper 21 is at rest, relative to the carriage 11, in a stationary end-of-travel position, and is driven forwards and rearwards only when it discharges its material B into the cavity 6. To the front of the body 12 there is a relatively thin plate 24 which slides while adhering to the surfaces 13 and 14 on which the lower mouth 22 of the hopper 21 slides when this is driven forwards and rearwards. The plate 24 possesses two solid portions 24' which close the mouth 22 when the hopper is in said stationary position. In a position intermediate between the two portions 24', the plate 24 possesses an aperture 25 as large as the mouth of the cavity 6, through which the material in the hopper 21 descends into the cavity 6.

According to the invention, a blower device 30 is provided for blowing air, and means for moving the device 30 while being held a short distance from the upper surface of the material B' loaded into the mould cavity 6, in such a manner as to lift a thin gauged layer of material from the top thereof.

In particular, said means for moving the device 30 consist of the carriage 11 itself, the device 30 being fixed close to the front end of the carriage 11.

The blower device 30 is arranged to emit a thin sheet of air which extends transversely in a horizontal direction along the entire transverse dimension of the cavity 6.

Specifically, the blower device 30 comprise an elongate chamber 32 having a relatively narrow long blowing port 31 which extends longitudinally in a horizontal direction along the entire transverse dimension of the cavity 6.

To the side of the chamber 32, the blower device 30 comprises a relatively thin elongate part 40 forming a dihedron with a rounded edge 43 positioned parallel to the longitudinal axis of the blowing port 31. Within the part 40 there is formed a duct 34, connected to a source of compressed air and also connected to the chamber 32 by a plurality of channels 33 distributed along the entire transverse dimension, to feed compressed air to said blowing port 31.

Figure 3:
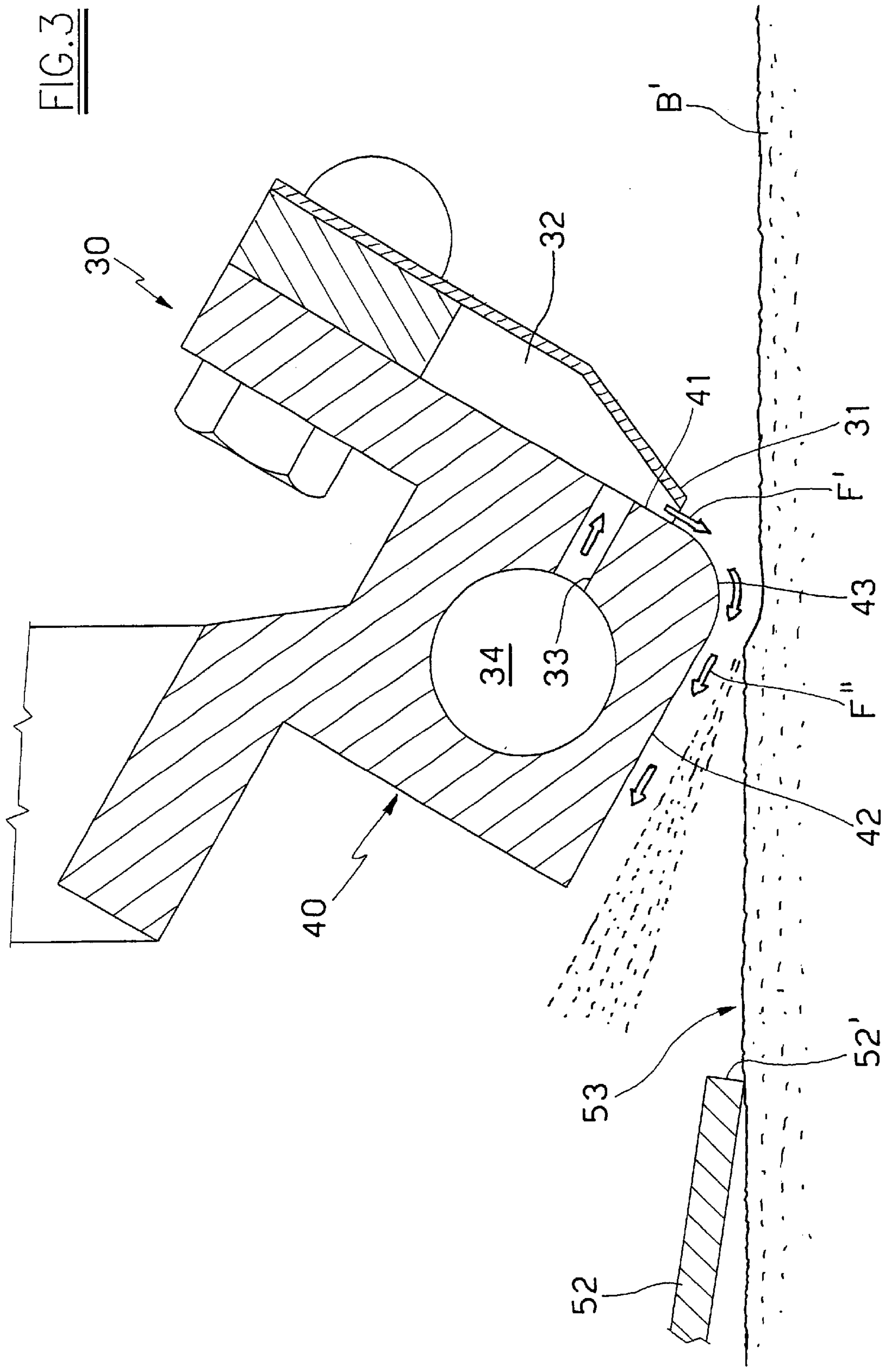
FIG. 3 is an enlarged detail of FIG. 2A.

The sheet of air emitted by the blowing port 31 travels along a first course F', then changes direction about the rounded edge 43 and finally travels along a second course F" forming an angle to the first course F'. The first course F' is directed downwards and towards the upper surface of the material B' loaded into the cavity 6, the second course F" being directed upwards and away from said upper surface (see FIG. 3 in particular).

Said special path of the blown air is obtained by the presence of the part 40, which has a first surface 41 positioned upstream of the edge 43 and having its cross-section parallel to said first course F', and a second surface 42 positioned downstream of the edge 43 and having its cross-section parallel to said second course F", the blowing port 31 being positioned to the side of the first surface 41 so that the exit flow F' grazes this surface 41.

The blowing port 31 is moved parallel to the upper surface of the material B' loaded into the mould cavity, with the rounded edge 43 disposed lower than the blowing port 31 and second surface 42 and relatively close to the upper surface of the material B', so as to lift a light gauged layer of material from the top thereof.

Means are associated with the blower device 30 to collect the material lifted into air by the device 30, and remove it from the mould cavity 6.

Said collection means comprise a container 51 associated in fixed spatial relationship with the blower device 30, to collect and contain the material lifted into the air by the device 30, and comprising on its base a virtually horizontal collection wall 52 having an end edge 52' parallel to and spaced from the second surface 42 of the thin elongated part 40, to define a longitudinal opening 53 through which the material lifted by the blower device 30 enters the container collection chamber 54.

The collection means also comprise a suction means having a port 55, fixed to the press bed to draw in the lifted material and, in particular, associated with the container 51 in such a manner as to draw in and remove the material collected in the chamber 54 thereof.

In operation, the loading apparatus 10 firstly loads the material into the mould cavity 6 in known manner.

In the example illustrated in the figures, this is achieved by firstly positioning the loading compartment 15 above the cavity 6 so that the material A falls by gravity into the cavity 6 to form a first layer A'; during this step, the hopper 21 is at rest in its end-of-travel position above the portion 24' of the plate 24, which closes its mouth 22.

Then, during the return stroke, the carriage 11 is temporarily halted in a position such that the aperture 25 in the plate 24 lies superposed on the cavity 6. While the carriage 11 is in this position, the lower punch 5 is lowered to lower the upper surface of the layer A' and leave a space in the cavity 6 to contain a second layer, above the first; simultaneously, the hopper 21 undergoes an outward stroke or a double outward and return stroke in the longitudinal direction, and fills the remaining volume of the cavity 6 to form an upper second layer B', the upper surface of which reaches the upper edge of the aperture 25.

The carriage 11 is then pulled into its retracted position, the mould cavity 6 being completely full.

During this return stroke, the upper surface of the second layer B' is scraped by the rear edge of the aperture 25 which inevitably displaces the powders of the upper surface layer of material in a disordered manner. This drawback is overcome in that, as provided by the invention, during this return stroke the upper surface of the material, which has been scraped, is exposed to the action of the blower device 30 which blows out a thin sheet of air such as to lift and remove a thin gauged surface layer of material.

In detail, the sheet of air leaving the port 31 is firstly directed (course F') downwards towards the upper surface of the layer B'; the dynamic action of the blown air strikes the upper particles of the layer B' and lifts them; the same air then flows about the edge 43 and finally assumes an upward direction (course F"), which by its velocity creates a slight vacuum to drag the lifted particles and transport them, through the opening 53, into the chamber 54; these particles remain enclosed within this chamber 54, to remain in suspension in the air and/or be deposited on the bottom of the chamber 54 when the air loses its dynamic action. The opening 53 can have a size greater than that illustrated, to the extent that the lower wall 52 can be completely or nearly eliminated; in that case, the powders lifted by the sheet of air remain suspended in air within the chamber 54.

For a good result, it is important that the blower device be able to blow out a very thin sheet of air (a few millimeters) at relatively low pressure. Excellent results were obtained with a blower device for air sheet production produced by MEECH-ARTEX Ltd. of Witney, Oxfordshire (UK).

By passing the device 30 and the container 51 over the entire upper surface of the layer B', a thin layer (1–3 millimeters) of material is removed, sufficient to completely remove the undesired effects caused by the scraping or other surface actions.

During the removal action, the container 51 is subjected to the influence of the suction means 55 which draws the collected material (both deposited and in suspension) from the collection chamber 54 of the container 51 and returns it to the production cycle.

Figure 4:
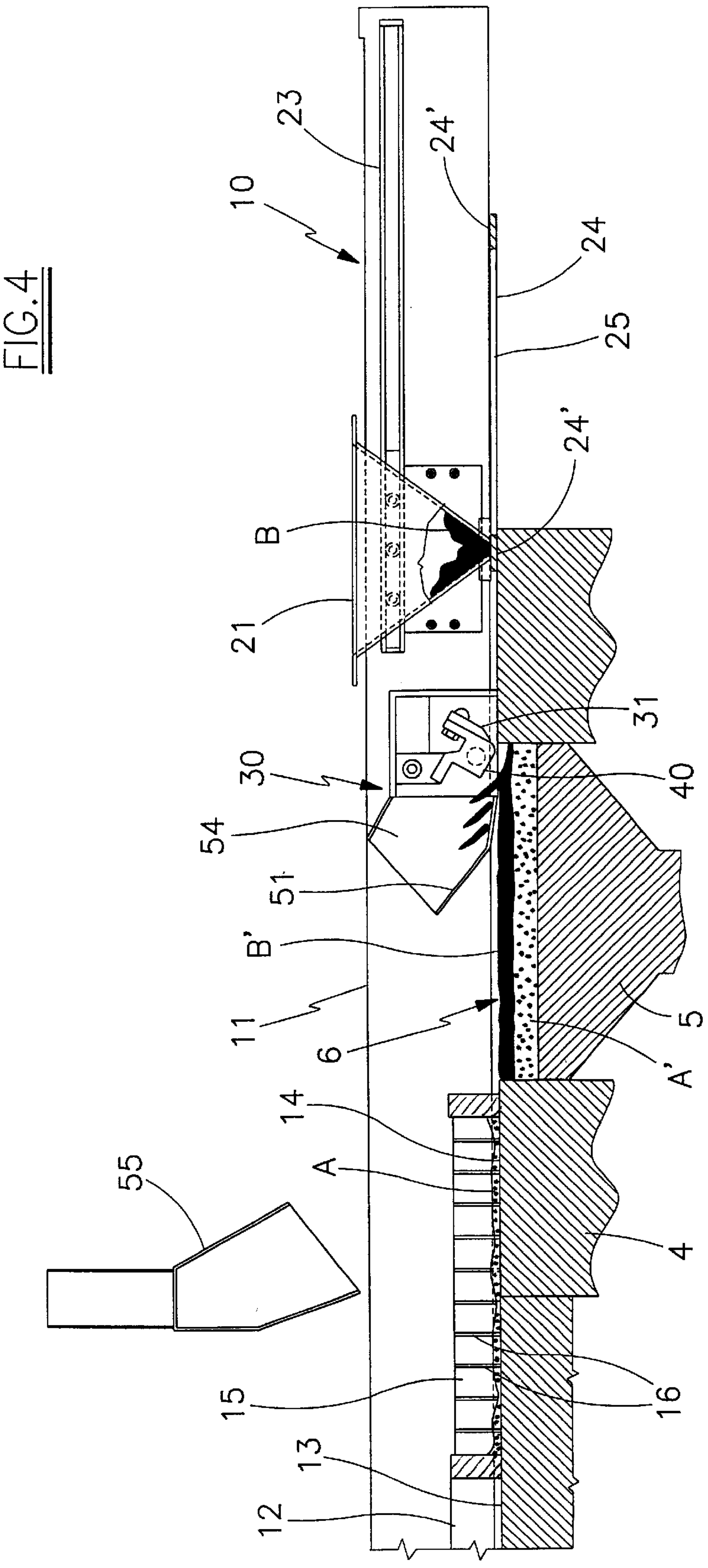
FIG. 4 is a section as FIG. 1, through a second embodiment of the invention.

FIG. 4 shows a different embodiment of the invention, in which the loading apparatus 10 is substantially equal to that described, and in particular comprises, as the preceding, two separate means for releasing two different materials through the upper mouth of the cavity 6 in combination with its own reciprocating movement. In detail, the first means is defined by the loading compartment 15, which releases the first material A into the cavity 6, the second means being defined by the minor hopper 21, which releases the second material B.

This embodiment differs from the preceding in that the blower device 30 is carried by the carriage in a position intermediate between said two material release means 15, 21.

This embodiment implements the following method of loading.

A layer A' of the first material A is firstly deposited in the mould cavity 6 in traditional manner, ie by moving the upper surface of the lower punch 5 downwards a certain distance below the surface 14, and filling the resultant cavity 6 with the material lying in the loading compartment 15.

Then, during the return stroke of the carriage 11 (towards the left in the figures) the upper surface of this layer A' is exposed to the action of the blower device 30 which, by virtue of the emitted air jet in the form of a thin sheet, lifts and removes a thin gauged surface layer of material from the top of the layer A', in the manner described for the first embodiment.

The carriage 11 is then further retracted towards its return position and the hopper 21 is slid in a longitudinal direction to above the cavity 6 while maintaining the lower punch 5 at rest, so that a layer B' of the second material B is deposited in the cavity 6 such as to occupy the empty pace resulting from the action of the blower device 30.

With this method, a very thin layer B (or several successive layers) of very precise thickness can be formed on the first layer A.

Alternatively, instead of extending along the entire dimension of the cavity 6, the sheet of air emitted by the blower device 20 could extend along only certain segments of it, for example to achieve particular aesthetic effects.

Numerous modifications of a practical and applicational nature can be made to the invention, but without deviating from the scope of the inventive idea as claimed below.

What is claimed is:

1. A method for loading the mould cavity with powder or granular material, in ceramic tile manufacture, by means of a loading unit comprising a loading apparatus (10) arranged to load material into the mould cavity (6), characterised in that after the mould cavity (6) has been filled with the powder or granular material, the upper surface of this latter is exposed to an air jet in the form of a thin sheet emitted by a blower device (30), such that a thin gauged surface layer of material is lifted and removed.

2. A method as claimed in claim 1, using a loading apparatus (10) driven with reciprocating movement parallel to the upper mouth of the cavity (6), and carrying at least two separate means for releasing that number of different materials though said upper mouth in combination with its own reciprocating movement, said blower device (30) being carried by the loading apparatus (10) in a position intermediate between said two material release means, characterised in that following the deposition of a layer of a first material in the mould cavity (6), the upper surface of this layer is exposed to an air jet in the form of a thin sheet emitted by a blower device (30), such that a thin gauged surface layer of material is lifted and removed, a layer of a second material is deposited in the cavity (6) such as to occupy the empty space resulting from the blower device.

* * * * *